United States Patent [19]
Henry et al.

[11] Patent Number: 5,719,976
[45] Date of Patent: Feb. 17, 1998

[54] OPTIMIZED WAVEGUIDE STRUCTURE

[75] Inventors: Charles Howard Henry, Skillman; Edward John Laskowski, Scotch Plains, both of N.J.; Yuan P. Li, Duluth; Henry Howard Yaffe, Dunwoody, both of Ga.

[73] Assignee: Lucent Technologies, Inc., Murray Hill, N.J.

[21] Appl. No.: 547,767

[22] Filed: Oct. 24, 1995

[51] Int. Cl.⁶ .................................................. G02B 6/26
[52] U.S. Cl. .................. 385/50; 385/28; 385/43; 385/42
[58] Field of Search .......................... 385/28, 27, 43, 385/50, 42, 16, 46; 372/6

[56] References Cited

U.S. PATENT DOCUMENTS

| | | | |
|---|---|---|---|
| 4,904,042 | 2/1990 | Dragone | 360/96.16 |
| 4,983,006 | 1/1991 | Nishimoto | 385/16 |
| 5,136,671 | 8/1992 | Dragone | 385/46 |
| 5,156,001 | 10/1992 | Takagi et al. | 385/42 |
| 5,285,305 | 2/1994 | Cohen et al. | 359/110 |
| 5,309,534 | 5/1994 | Cohen et al. | 385/27 |
| 5,396,507 | 3/1995 | Kaminow et al. | 372/6 |
| 5,408,555 | 4/1995 | Fielding et al. | 385/43 |
| 5,524,156 | 6/1996 | Van Der Tol | 385/28 |
| 5,526,453 | 6/1996 | Wolf et al. | 385/42 |
| 5,570,442 | 10/1996 | Arii et al. | 385/46 |

OTHER PUBLICATIONS

Suzuki et al., Planar Lightwave Circuits Based on Silica Waveguides on Silicon, Electronics & Communications in Japan, Part 2, vol. 77, No. 11, 1994, pp. 25–36.

Henry et al., Glass Waveguides on Silicon for Hybrid Optical Packaging, Jrnl. of Lightwave Technology, vol. 7, No. 10, Oct. 1989, pp. 1530–1539.

*Primary Examiner*—Rodney B. Bovernick
*Assistant Examiner*—Yisun Song

[57] ABSTRACT

An optimized waveguide structure enables the functional integration of various passive optic components on a single substrate. The optimized waveguide structure is characterized by a thicker core layer than used for square core waveguides and a core width that changes according to different functional regions of the optic circuit within which it is incorporated. The height (H) of the waveguide core is determined by the thickness of the core layer defined during the fabrication process and is ideally uniform across the circuit. The width (W) of the core, however, is changed between functional regions by the photo-lithographic mask and the chemical etching during the fabrication process. By way of example, an optimized waveguide structure for a P-doped silica planar waveguide with a $\Delta$ approximately 0.6% for wavelength $\lambda=1.2$–$1.7$ μm, has a single uniform height of $H=6.7$ μm and a width that changes between $W=4$ μm in a coupler region, $W=5.5$ μm in a bend region, $W=9$ μm in a fiber coupling region, and $W=10$ μm in a phase grating region of a Dragone router. Adiabatic tapers are used as transition regions between regions of different core widths.

10 Claims, 6 Drawing Sheets

OPTIMIZED WAVEGUIDE STRUCTURE

FIELD OF THE INVENTION

The present invention generally relates to planar optical waveguides, and more particularly, to an optimized waveguide structure having a uniform core height and a core width that varies according to the functional regions of the waveguide in order to enable high performance functional integration of various passive optic components on a single substrate with a common mass production fabrication technique.

BACKGROUND OF THE INVENTION

An optical circuit generally comprises an optically active device, such as a laser or photo-diode, optical waveguides for providing both interconnections and passive optical components, and packaging to provide a controlled environment and conduit to the external world. Typically, a passive optical component, such as a Dragone router or Fourier filter, includes two or more waveguides so as to form one or more functional regions, e.g., a coupler region or phased array region. In a commercial sense, it would be highly desirable to be able to integrate passive optical components and interconnections on a single substrate with a common mass production fabrication technique.

The most advanced and technically developed planar waveguides are doped-silica waveguides fabricated with silicon optical bench (SLOB) technology. A doped-silica waveguide is usually preferred because it has a number of attractive properties including low cost, low loss, low birefringence, stability, and compatibility for coupling to fiber. Further, the processing steps are compatible with those in silicon integrated circuit (IC) technology, which are geared for mass production and are readily known.

Generally, a doped-silica waveguide is formed by initially depositing a base or lower cladding layer of low index silica on a silicon or silica substrate. A layer of doped silica with a high refractive index, i.e. the core layer, is then deposited on top of the lower cladding layer. The core layer is subsequently patterned or sculpted into structures required by the optical circuits using photo-lithographic techniques similar to those used in integrated circuit fabrication. Lastly, a top cladding layer is deposited to cover the patterned waveguide core. This technology is generally described, e.g., in U.S. Pat. No. 4,902,086 issued to C. H. Henry et al.

Critical to the performance of any planar optical waveguide are the waveguide dimensions, i.e., the height and width of the waveguide core, and the refractional difference of the refractive index between the core and the cladding of the waveguide, denoted as A. The height (H) or thickness of the core is determined by the thickness of the core layer and the width (W) of the core is determined by the photo-lithographic mask and undercut in chemical etching. The A of a waveguide is mostly determined by the material system and the fabrication process. In practice, different waveguide structures and systems are used for different types of functions and trade-offs are made in the core dimensions and A to optimize different aspects of optical performance. For example, the following discussion addresses some of the trade-offs presently made for different passive optic components.

First, a standard P-doped waveguide has a symmetrical square core structure approximately 5 μm wide, a thick lower cladding approximately 15 μm, a thick upper cladding of approximately 15 μm, and a medium Δ of about 0.6%. A square-shaped core with equal width and height is chosen mainly because it best emulates a circular optical fiber, and because of the convenience in modeling and mask layout. The dimension of the core is chosen to be as large as possible for strong optical confinement and low propagation loss, but small enough so that the waveguide remains single mode. However, this waveguide has a considerable mode-field mismatch with a standard single mode optical fiber that has a low Δ~0.3% and a core diameter of about 8 μm. The fiber-waveguide-fiber coupling loss with the above-described waveguide is about 0.8 dB at a wavelength of λ=1.3 μm. For purposes of clarity, hereafter a low Δ refers to 0.2%<Δ<0.5%, a medium Δ to 0.5%<Δ<0.8%, and a high Δ to 0.8%<Δ<2.5%.

In order to reduce the mode-field mismatch for low insertion loss applications, low Δ waveguides have been considered. However, to reduce the chip size of highly complex optical circuits, high Δ waveguides are desirable, because a stronger optical confinement allows for a smaller bend radius. Thus, to meet the requirements of different applications, different fabrication processes for different waveguide structures are often used. For instance, three different waveguide configurations having Δ's of about 0.3%, 0.7% and 1.5%, and square cores of about 8 μm, 6 μm, and 4 μm, respectively, may be used to implement an optical circuit with different functional regions in order to optimize performance in each respective region. However, such multiple waveguide configurations are extremely difficult to integrate on a single substrate, much less with a common fabrication process, because, inter alia, the core height or thickness must vary between the different functional regions.

Secondly, lot-to-lot and wafer-to-wafer variations in coupling length due to uncontrolled fabrication errors are presently overcome by putting several groups of devices with differing lengths of the couplers on a single photo-lithographic mask. This approach, however, results in low yield because only one of the group typically produces a working device for each lot of wafers. Further, this approach does not solve any device performance problems associated with fluctuations in the waveguide cross section and wafer-scale non-uniformity.

Lastly, the crosstalk in a Dragone router is sensitive to random phase errors of the phase grating waveguides. To reduce such errors caused by fluctuations in waveguide width, a waveguide having a Δ~0.6%, and dimensions of W~8 μm and H~3.5 μm is utilized. However, compared to the 5 μm square waveguide, this waveguide structure has even larger mode-field mismatch with the standard fiber, and the couplers are more sensitive to the uncontrolled variations in the waveguide height and width. Moreover, because of the Dragone router, Fourier filter and other optical devices are developed on waveguide structures with different core thicknesses, it is difficult to integrate these devices into a more functional circuit on the same wafer or substrate.

Accordingly, there exists a need for a waveguide structure capable of providing multiple functional regions integrated on a single substrate and fabricated with mass production integrated circuit techniques so as to enable high density integrated optical circuits.

SUMMARY OF THE INVENTION

Briefly described, the present invention is an optimized structure for doped silica planar waveguides. The optimized waveguide allows for efficient waveguide-fiber coupling, reduction in fabrication-error in sensitive couplers and delays, and small bend radius. Further, it enables a common fabrication process to integrate basic components, such as Dragone routers and Fourier filters, with high yield. The optimization is accomplished by using a thicker core layer than that for typical square-core waveguides, and a core width that changes with different functional regions of the optical circuit via photo-lithography fabrication techniques. By way of example, an optimized single mode P-doped silica waveguide with a $\Delta$ of approximately 0.6% has core dimensions of H~6.7 µm and W=4 µm for wavelengths $\lambda$=1.2 to 1.7 µm. In a fiber coupling region, the waveguide expands to a width W~9 µm while the core height remains uniform. In a bend region, the waveguide expands to a width W~5.5 µm while the core height remains uniform. Further, in a phase array region of a Dragone router, each waveguide expands to a width W~10 µm, while the core height remains uniform. These are merely illustrative examples of the various changes in core width that can be implemented via photolithography in order to optimize waveguide performance while keeping the core height uniform across the substrate.

The optimized waveguide is highly practical because it relies on mask designs that hardly complicate the material deposition and chemical processes. Moreover, the optimization methods disclosed herein are equally applicable to other waveguide systems.

BRIEF DESCRIPTION OF THE DRAWINGS

The present invention, as defined in the claims, can be better understood with reference to the following drawings, wherein like reference numerals represent corresponding parts throughout the several drawings. Further note that the drawings are not necessarily to scale, emphasis instead being placed upon clearly illustrating the principles of the present invention.

DETAILED DESCRIPTION

I. Introduction To The Invention

This invention pertains to the optimization of waveguide structures for integrated optical circuit fabrication compatibility, high device performance, and high yield. The optimization can be performed to integrate various types of optical devices, such as Dragone routers, Fourier filters, or Y-branches, into functional passive circuits for optical fiber communication systems, especially for local distribution networks urging point-to-multipoint architecture. In essence, the process of optimization involves finding a common core thickness and different core widths for different functional regions, for instance at a fiber-waveguide-fiber coupling region, a coupling region of a coupler, or a bend region. For purposes of illustrating the present invention, the optimization process is described below on a P-doped silica waveguide for wavelengths of 1.2 to 1.7 µm. It can be appreciated, however, by one of ordinary skill in the art, that the principles and teachings of the present invention are equally applicable to other waveguide systems, such as glass systems, organic material systems, or semiconductor systems.

Figure 1:
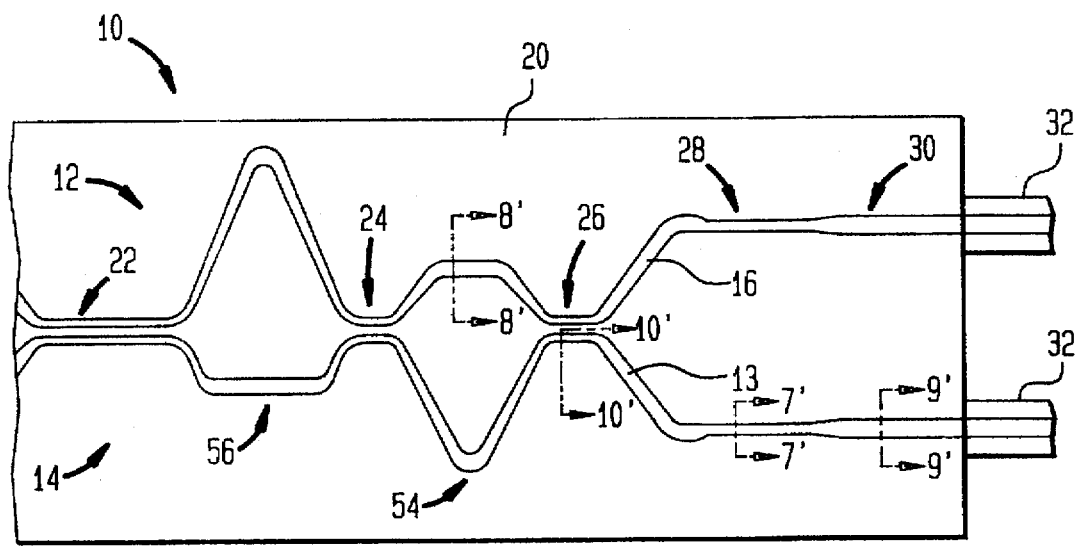
FIG. 1 is a schematic illustration of the top view of an optimized waveguide in accordance with the present invention illustrating the functional regions thereof.

Referring to the drawings, FIG. 1 illustrates a Fourier filter 10 comprising optimized waveguides 12, 14 in accordance with the present invention. Particularly, FIG. 1 illustrates the in-plane patterns of the cores 16, 18 of waveguides 12, 14, respectively, defined by a photo-lithographic mask during the fabrication of filter 10 on a substrate 20. The cores 16, 18 have substantially identical and uniform height (H) and widths (W) that changes at the different functional regions in order to optimize the performance of waveguides 12, 14, as explained in detail below.

Following the discussion of the optimization process is a discussion directed to the fabrication of an optimized waveguide in accordance with the present invention.

II. Optimization Process

A. Single Mode Operation

Many optical devices are based on single-mode waveguides or include single mode regions. For example, regions 22, 24, 26 and 28 of filter 10 are single-mode in the preferred embodiment. Specifically, regions 22, 24 and 26 are couplers of single-mode waveguides 12, 14, and the region 28 is provided to strip higher order modes in the waveguide ends 30 coupled to optical fibers 32. Note that other waveguide regions of the filter 10 may not be single-mode, and therefore, multi-mode waveguides can be used, provided that mode conversion is small or that the converted high order modes can be striped, as accomplished by region 28.

For a weak guiding waveguide, the spatial distribution of the light intensity (of the fundamental mode) is approximately symmetric gaussian, and the single-mode condition requires that, to the lowest order of approximation, the cross-sectional area of the core be below a maximum value. With a P-doped silica waveguide having a $\Delta$ approximately 0.6%, the maximum core area is about 30 µm$^2$ for wavelengths $\lambda$ of 1.3 to 1.7 µm. Therefore, numerous core dimensions can be utilized which result in a cross section area less than 39 µm$^2$, for example 5×5 µm$^2$, 3×8 µm$^2$, or 6.7×4 µm$^2$. However, because the height of the waveguide core is determined by the thickness of the core layer during fabrication, it is extremely difficult to fabricate on a single substrate a waveguide core having more than one height. Thus, it is highly preferable to design a waveguide structure in which the core height remains constant and uniform across the substrate. Since the core height is the same at the different functional regions of the waveguide, the width of the core is engineered to change at the different functional regions in order to optimize performance in each region.

Figure 7:
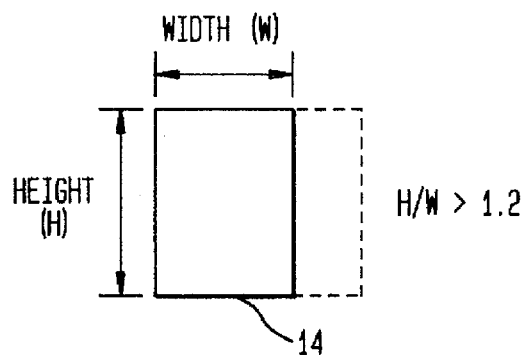
FIG. 7 is a cross-sectional view taken along line 7'—7' in FIG. 1, and showing the range of widths in a single mode region in accordance with the present invention.

Accordingly, a core height of H=6.7 μm has been determined as optimum for a P-doped silica waveguide. The corresponding core width for a single-mode waveguide is W=4 μm though the core width varies as a function of the following design considerations. As previously stated, the dimensions provided herein are merely illustrative and shall be construed in any way as limiting the scope of the present invention. Instead, the principles disclosed herein, including the aspect ratio of the core height and width, are transferable and are equally applicable to other waveguide systems. Accordingly, an optimized waveguide according to the present invention has core height of approximately H=6.7 μm and width between approximately 4 μm and 10 μm based upon the application of the following design considerations. A preferred aspect ratio of the core height to width of a single mode region 28 is greater than 1.2 in order to strip the higher order modes, as discussed in greater detail below. An illustration of this aspect ratio is provided in FIG. 7, wherein the height is constant and the width is shown at a maximum value of approximately W=0.83 H.

B. Fiber Coupling Loss

When a waveguide is coupled to an optical fiber, fiber coupling loss results from the mode-field mismatch between the waveguide and the fiber and the misalignment of the fiber relative to the waveguide. The former is due to the differences in the size and the Δ between the waveguide and the fiber. For example, a commonly used single-mode fiber for 1.3 μm and 1.55 μm wavelength communications is the AT&T 5D fiber, which has a Δ of about 0.3% and a core diameter of about 8 μm. However, the Δ of most planar waveguides is preferably higher, for example, 0.6% for a P-doped silica waveguide. This preference is because of the size limitations in practical waveguide fabrication and because a higher Δ allows for higher integration density on the substrate. As a result of the higher Δ, the core size, as well as the size of the guided optic mode, in a typical single-mode waveguide are usually smaller than those in commonly used fiber, such as the AT&T 5D fiber.

Figure 2:
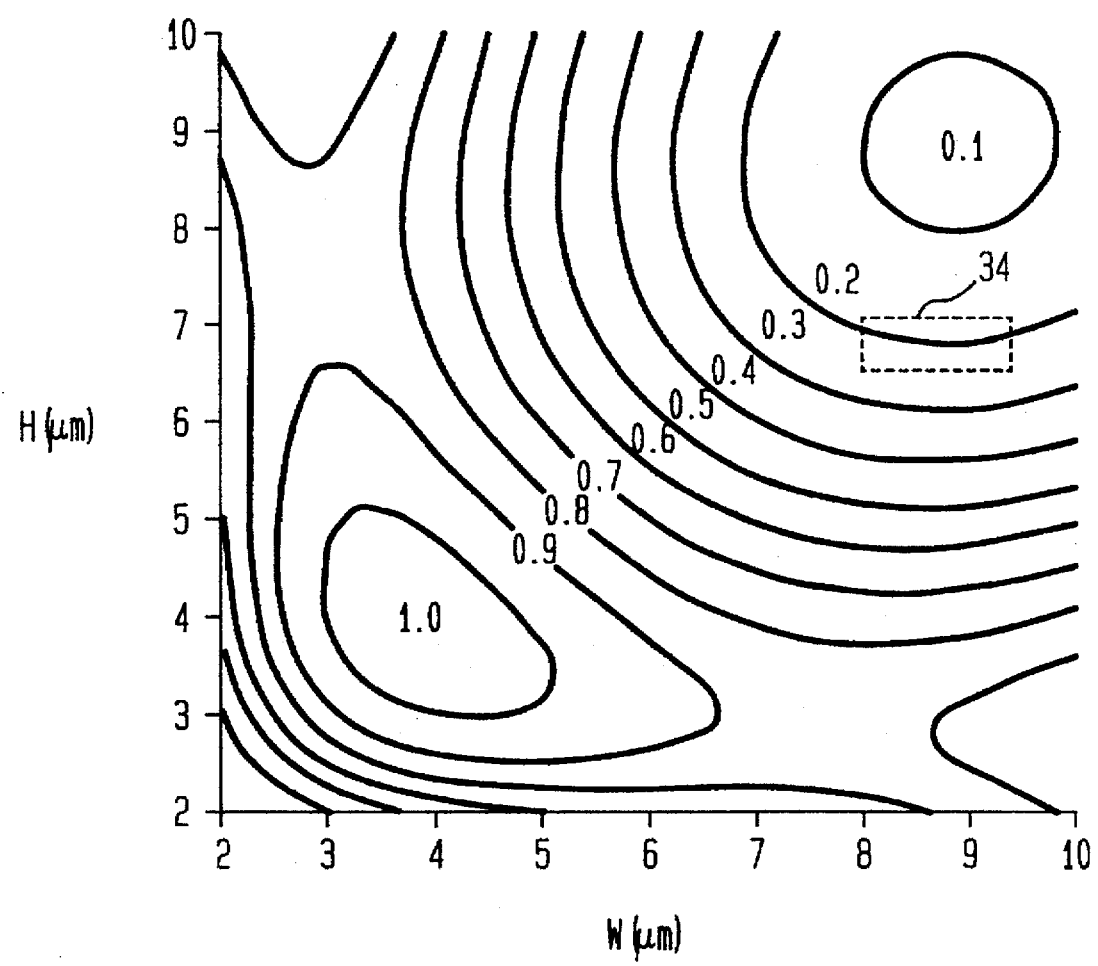
FIG. 2 is a contour plot of a fiber-waveguide-fiber mode-field mismatch loss with a waveguide in accordance with the present invention.

Using a P-doped silica waveguide and a AT&T 5D single mode fiber at λ=1.3 μm, a contour plot of calculated fiber-waveguide-fiber (two interfaces) mode-field mismatch loss in relation to core height (H) and width (W) is illustrated in FIG. 2. For example, the coupling loss of a waveguide having core dimensions of H=5 μm and W=5 μm is about 0.8 dB and a waveguide having core dimensions H=3 μm and W=8 μm is about 1.0 dB.

If the size of the core is expanded, the optical mode can be extended to better match that of the fiber. An exact match occurs only when the Δ of the waveguide is also effectively diluted to that of the fiber, which is difficult with present fabrication techniques. However, the contour plot of FIG. 2 shows that the coupling loss is below 0.25 dB for a waveguide having core dimensions of H=6.7 μm and W=9 μm m without having to dilute the Δ, as indicated by the rectangular box 34. This mount of loss is satisfactory for most applications and was previously achievable only with low-Δ waveguides. In addition, if the core height is increased to 9 μm, then the coupling loss is further reduced to about 0.1 dB, but in order to remain a single-mode waveguide with H=9 μm, would require a core width too narrow for reliable fabrication with present techniques. Further, if the core height were 5 μm, as with the conventional waveguides, the coupling loss is larger than 0.5 dB, even if the core width is expanded. In application, a fiber-waveguide-fiber coupling loss of less than 0.3 dB and course wavelength division multiplexers (WDMs) with −50 dB crosstalk have been achieved regularly with H=6.7 μm.

As shown in FIG. 1, the waveguide end regions 32 have been widened to W~9 μm in order to reduce fiber-waveguide-fiber coupling loss. As a result, the waveguide is multi-mode at the end region with H=6.7 μm and W=9 μm, and thereby allows light to couple to the higher order modes in the presence of misalignment. Therefore, a single mode region 28 is added to strip the higher order modes. Worth noting at this point, adiabatic tapers of typically 500 μm in length are used as transition regions where the waveguide width is gradually expanded or narrowed e.g., between regions 28 and 30 in FIG. 1. Accordingly, regions 28 and 30 are referred to as an expanded mode taper.

Segmented mode tapers have also been proposed to reduce the fiber-waveguide coupling loss but they are not practical to provide fiber-waveguide-fiber coupling loss of less than 0.3 dB due to their added insertion loss. Compared to segmented mode tapers, the expanded mode taper configuration disclosed herein has much less insertion loss, is tolerant to fabrication errors of undercut and chip dice position, and does not have back reflection.

In regard to the fiber coupling loss attributable to the misalignment of the fiber relative to the waveguide, the coupling loss is affected by the mode size of the waveguide and the fiber. For a larger mode size, the coupling loss becomes smaller for transverse misalignment and larger for angular misalignment. Thus, since transverse misalignment dominates in fiber attachment and wafer testing, the expansion of the waveguide dimension, and consequently increasing the mode size, in order to optimize performance at the end regions 30 also reduces the overall misalignment loss.

Figure 9:
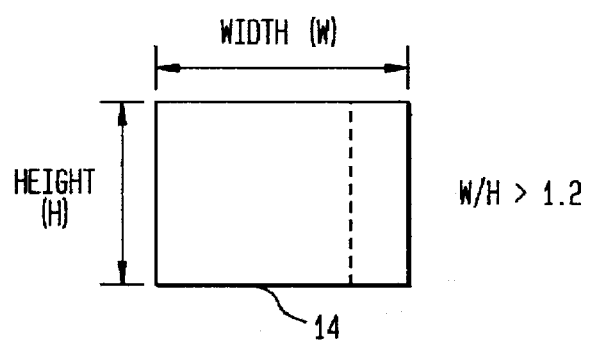
FIG. 9 is a cross-sectional view taken along line 9'—9' in FIG. 1, and showing the range of widths at a waveguide fiber coupling region in accordance with the present invention.

Thus, it is preferable that in an end region of a P-doped silica waveguide where the waveguide is coupled to an optical fiber, the aspect ratio of the core width to height be greater than about 1.2. An illustration of this aspect ratio is provided in FIG. 9, wherein the height is constant and the width is shown at both a maximum value of W=1.2 H and a minimum value of W=0.8 H.

C. Coupling Efficiency

The coupling efficiency of a coupler comprising two close-by single-mode waveguides (e.g., regions 22, 24 and 26 in FIG. 1) is characterized by the coupling length, which is the minimum coupler length required for the fight to couple from one waveguide to the other. The coupling length is very sensitive to the core width and separation of the two waveguides 12, 14, because the coupling results from the overlap of the tails of the optical fields of the two waveguides. In fabrication, the center-to-center separation is relatively fixed, but the core width and edge-two-edge separation changes because of uncontrolled changes in photo-lithography conditions and etching undercut. Thus, for high yield production such as that typically seen in the semiconductor industry, the coupling length must be stable against such fabrication errors.

Figure 3A:
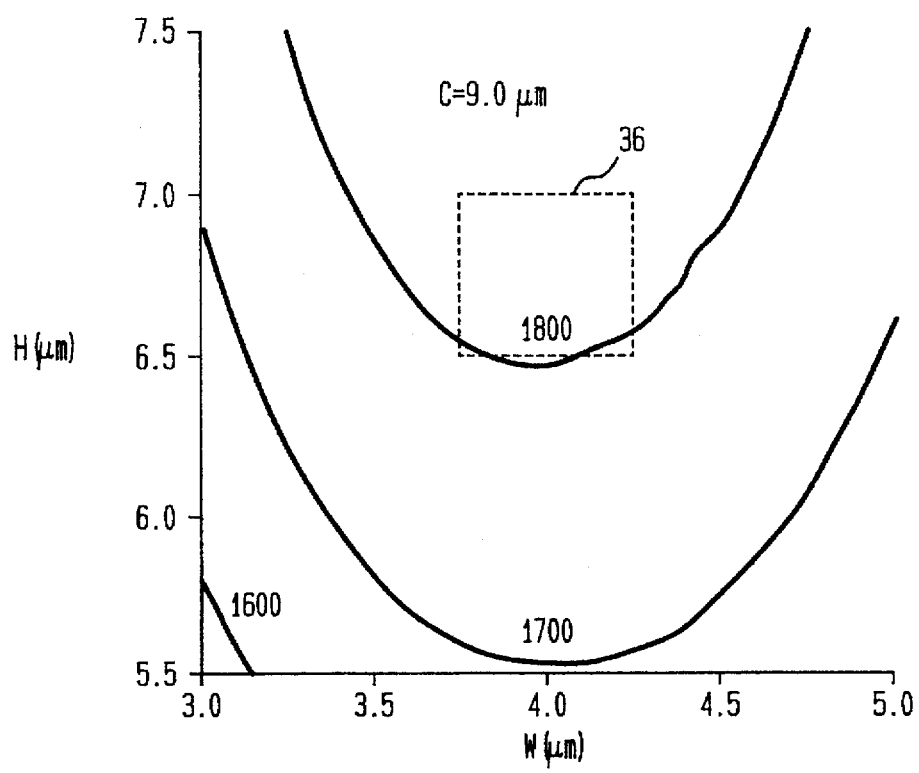
FIG. 3A is a contour plot of the coupling length for couplers in accordance with the present invention and having a center-to-center separation of 9.0 µm.
Figure 3B:
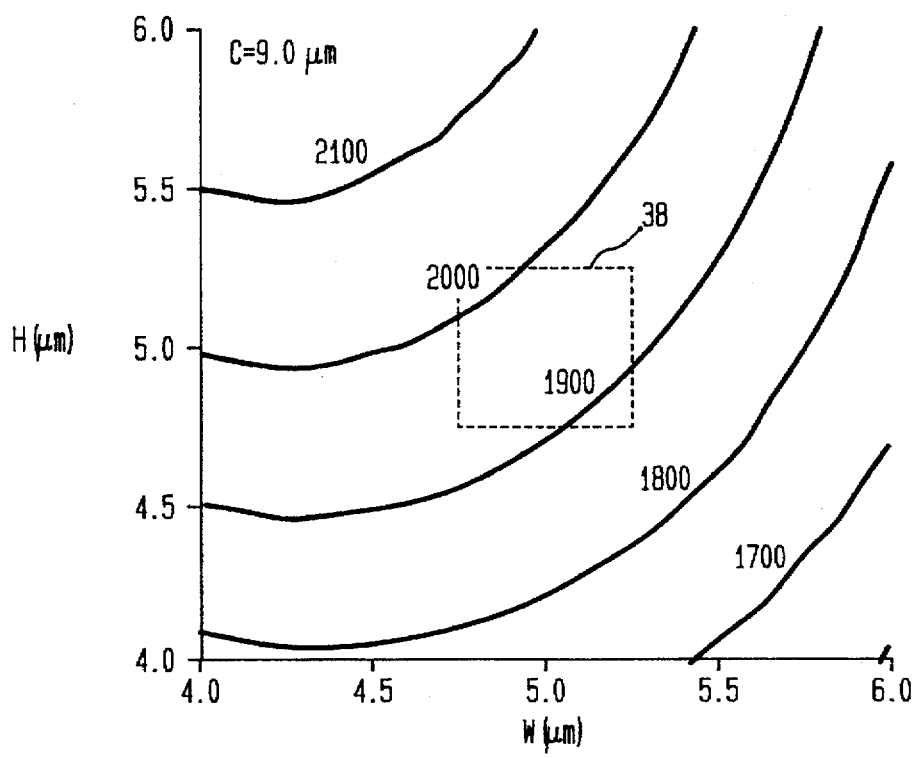
FIG. 3B is a contour plot of a coupling length for conventional couplers having a center-to-center separation of 9.5 µm.

Referring to FIGS. 3A and 3B, contour plots are presented illustrating the coupling length calculated for couplers of center-to-center separations of C=9.0 μm in FIG. 3A and C=9.5 μm in FIG. 3B, at λ=1.55 μm for a P-doped silica waveguide.

In FIG. 3A, the contour curves become parallel to the core width W-axis around W=4 μm, suggesting the coupling length is most insensitive to variations in the width at this dimension. The step and size in coupling length between adjacent curves is 100 μm for the plots in both FIG. 3A and 3B. However, the vertical spacing between adjacent curves in FIG. 3A is about a factor of two larger than that in FIG. 3B, indicating that the coupling length for the optimized waveguide is also less sensitive to changes in core height than for the square waveguide. As noted the dash line rectangle 36 in FIG. 3A, an optimized waveguide has a core height of 6.7 μm and a core width of 4 μm. In comparison, FIG. 3B is centered about a waveguide core dimensions of 5×5 μm², as noted by rectangular box 38.

The existence of such a stable configuration can be understood as follows. For a fixed center-to-center separation, there are two effects when the width of both waveguides is reduced. One is that the optical fields are less confined and extend more into the gap between the waveguides, which tends to result in stronger coupling. The other effect is that the gap between the two waveguides becomes larger, which tends to result in weaker coupling. The two effects balance each other in the above stable configuration. The coupling wavelength also becomes insensitive to core height in this configuration because the mode confinement depends on the area of the core to the lowest order of approximation, and changing the height has two competing effects similar to those of changing the width.

Figure 10:
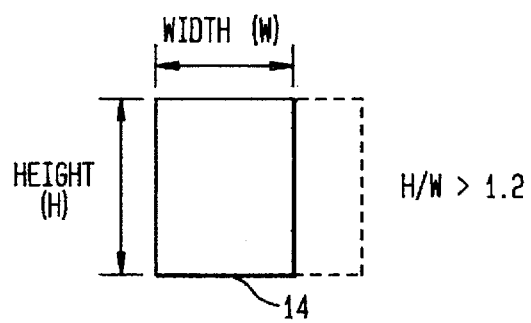
FIG. 10 is a cross-sectional view taken along line 10'—10' in FIG. 1, and showing the range of widths at a single mode coupling region in accordance with the present invention.

The stable core width is a function of center-to-center separation (C), and is weakly dependent upon the core height and wavelength λ. The center-to-center separation is chosen so that the coupling length is approximately 2000 μm at λ=1.55 μm for convenience in coupler design. The core height is chosen so that the waveguides are single-mode but nearly double-mode in the stable configuration. Generally, this requires the core height to be greater than the core width in the coupler region, and consequently, necessitating a thicker core layer than that for the square waveguide, which at the same time allows for better coupling to fibers using expanded tapers as described above. Preferably, in a coupling region of a P-doped silica waveguide, the aspect ratio of the core height to width is greater than 1.2. An illustration of this aspect ratio is provided in FIG. 10, wherein the height is constant and the width is shown at a maximum value of approximately W=0.83 H.

D. Stable Effective Refractive Index

Figure 4:
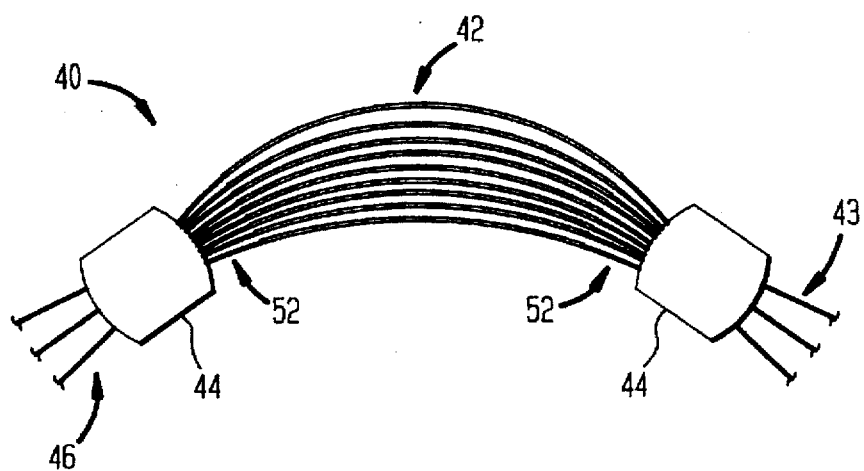
FIG. 4 is a schematic illustration of a top view of a Dragone router in accordance with the present invention.

For some devices, the effective refractive index of the included waveguides is required to be stable against uncontrolled fabrication errors. For example, FIG. 4 illustrates a Dragone router 40 comprising a phase grating array 42 disposed between two dielectric slabs (e.g., star couplers) 44, one or more input waveguides 46 and a plurality of output waveguides 48. The crosstalk in the Dragone router 40 is sensitive to random phase errors in the phase grating array 42 caused by fluctuations in waveguide core widths due to the digitization errors in the photo-lithographic mask and the irregularities of etching undercut. For instance, in a typical 8×8 router with free spectral range of 1600 Ghz, the total length of each grating waveguide is greater than 1 cm, but a phase error equivalent to 0.05 μm in path length is sufficient to cause severe degradation of the crosstalk performance. Therefore, the path length of each grating waveguide, which is the geometric length times the effective refractive index, must be controlled to extreme accuracy. Consequently, variations in the effective refractive index of the waveguides results in undesirable degradation of the crosstalk performance, and therefore, low yield.

Figure 5:
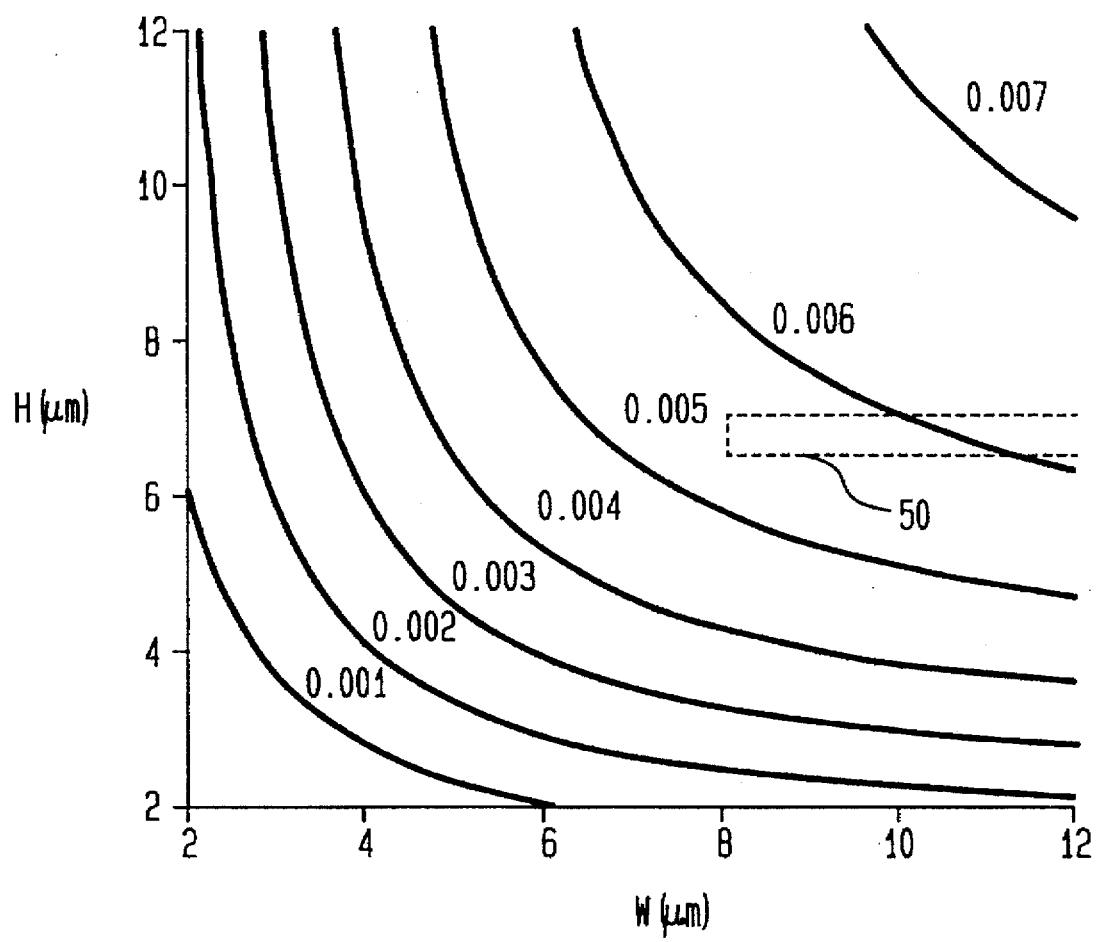
FIG. 5 is a contour plot of the effective refractive index as a function of core width and height.

A contour plot of the effective refractive index $n_{eff}$ (relative to the refractive index of the cladding, $n_{clad}$~1.445) as a function of core width and core height is calculated and plotted in FIG. 5 for P-doped waveguides at λ=1.55 μm. The horizontal spacing between adjacent curves indicates the variation in core width required to change $n_{eff}$ by 0.001. Suggested by the present invention is a core having dimensions of H=6.7 μm and W~10 μm, as indicated by the rectangular box 50 in FIG. 5, which is consistent with the core height chosen herein for stable couplers and low loss fiber-waveguide couplers. Preferably, each waveguide comprising phase grating array 42 of Dragone router 40 has an aspect ratio of core width to core height greater than 1.15.

Clearly seen with reference to FIG. 5, the $n_{eff}$ for a waveguide with core having dimensions of 6.7×10 μm² is less sensitive to changes in core width than conventional waveguides used in Dragone routers with core dimensions of height of 3 μm and width of 8 μm. Thus, such a waveguide structure is more stable against fabrication errors in core width as required to yield low crosstalk. However, because the waveguide becomes multi-mode due to the increase in core height and core width, single-mode regions 52 are added to strip the high order modes. Alternatively, each grating waveguides can be curved with a bend radius small enough so that all the high order modes are effectively radiated, eliminating the single-mode regions 52.

Figure 6:
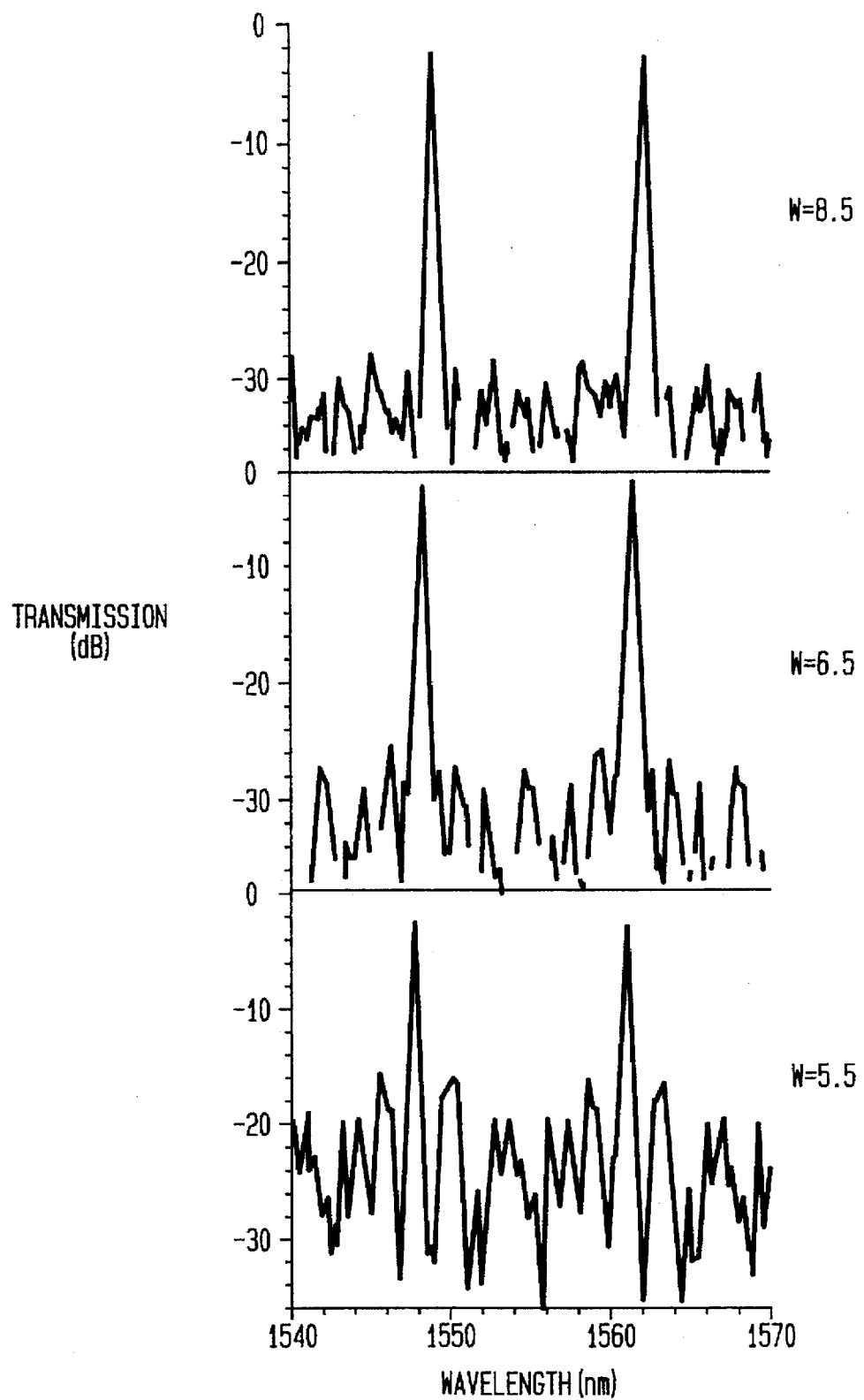
FIG. 6 is a plot of the transmission spectrum measured from three Dragone routers in accordance with the present invention having grating waveguide core widths of 8.5, 6.5, and 5.5 µm.

FIG. 6 illustrates the transmission spectrum measured from three 8×8 Dragone routers with channel spacing of 200 Ghz. The spectrum is measured from the 5th input to the 5th output though the fiber-waveguide coupling loss is not included. The devices are made with a P-doped silica waveguide on the same substrate with a core height H~6.7 μm. The three devices differ only in the core widths of the grating waveguides; 8.5, 6.5 and 5.51 μm respectively. The transmission spectrums show that the peak crosstalk is about −26, −22, and −14 dB for the W=8.5, 6.5, and 5.5 μm waveguides, respectively. The foregoing proves that a larger the core width results in smaller random phase errors, and demonstrates the feasibility of fabricating high performance Dragone routers with optimized waveguide core height disclosed herein.

E. Bend Loss

Bend regions are indispensable for many waveguide devices. For instance, the filter 10 illustrated in FIG. 1 includes bend regions 54 and 56, and the Dragone router 40 illustrated in FIG. 4 includes multiple waveguides having bend regions in the phase grating array 42. The bend radius of these bends must be large enough so that the insertion loss is acceptable. These bends, in many cases, determine the geometric size of the optic circuits into which they are incorporated, and thus, a smaller bend radius is deskable.

In cases where the waveguide is required to be single mode, a larger core dimension can be used so that a smaller bend radius can be allowed. A larger core dimension results in stronger confinement of the optical field, and hence, the light path can be bent more easily.

Figure 8:
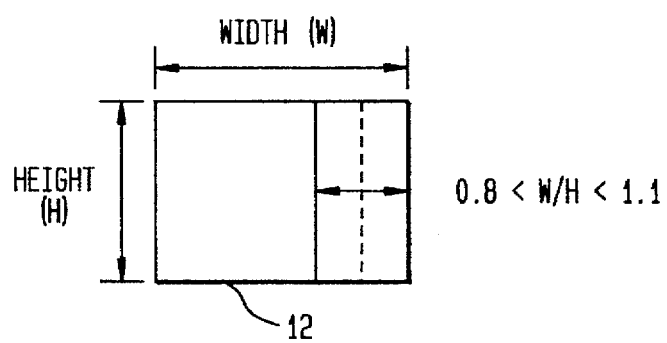
FIG. 8 is a cross-sectional view taken along 8'—8' in FIG. 1, and showing the range of widths in a bend region in accordance with the present invention.

In conventional waveguide devices, a minimum bend radius of 15 mm is achievable on a P-doped silica waveguide having a square core of 5×5 μm². However, by using a waveguide with core dimensions of H=6.7 μm and W=5 μm, the bend radius can be reduced to about 10 mm without interfering with the single-mode operation of the couplers. An even larger core width allows for further reduction of the bend radius, though the mode conversions on the bends eventually becomes severe requiring high-order-mode stripping regions such as regions 52 in the Dragone router 40 of FIG. 4. Thus, it is preferable in a bend region of a P-doped silica waveguide that the aspect ratio of the core width to height be greater than 0.8 and less than 1.1. An illustration of this aspect ratio is provided in FIG. 8, wherein the height is constant and the width is shown at a minimum value of W=1.2 H.

III. Fabrication

For purposes of illustrating the present invention, the P-doped silica waveguide structures discussed herein are advantageously fabricated using the following procedure.

Initially, a first approximately 15 μm base or low cladding layer of undoped $SiO_2$ (HiPOX) is formed by oxidation of Si under high pressure steam. A core layer of predetermined thickness comprising 7% P-doped $SiO_2$ (P-glass) is then deposited using low-pressure chemical vapor deposition (LPCVD). This step defines the thickness or height of the waveguide core uniformally across the substrate. The core layer is then annealed and steamed at about 1000° C.

The Core layer is then patterned or sculpted using a computer generated photolithographic mask. Thus, the core width can vary at different functional regions of the waveguide in order to optimize waveguide performance. A flow layer of about 1.51 μm thick B- and P-doped $SiO_2$ (BPTEOS) is subsequently deposited with LPCVD and annealed at 900° C. to fill the narrow gaps in between waveguide cores in the coupler regions. Finally, two layers of BPTEOS of 7.5 μm thickness each are deposited and annealed as the top cladding layer. The top cladding layer has almost the same refractive index as the base, and the core has a refractive index of about 0.63% higher than that of the lower and top cladding layers. Accordingly, because the core layer has uniform thickness across the substrate, various types of devices, such as Dragone routers, Fourier filters, and wire-branches, can be integrated into functional circuits on the same photolithographic mask and fabricated with a common process on a single substrate. This is achievable in the present invention by incorporating a single core layer thickness for all devices.

It should be noted, however, planar optical waveguides can be fabricated in any number of ways using various fabrication techniques such as sputtering, electron beam evaporation, or reactive ion etching. Nonetheless, the present invention is preferably fabricated as a doped-silica waveguide because of its low loss, low birefringence, and ability to couple with standard optic fibers.

It will be obvious to those skilled in the art that many modifications and variations may be made to the preferred embodiment described above without departing from the novel teachings of the present invention. All such modifications and variations are intended to be incorporated herein and within the scope of the present invention, as set forth in the following claims. Furthermore, in the claims hereafter, the corresponding structures, materials, acts, and equivalents of all means or step-plus-function, elements are intended to include any structure, material, or acts for performing the functions in combination with other claimed elements as specifically claimed.

Wherefore, the following is claimed:

1. A planar optical waveguide device, comprising:
   a substrate;
   a first waveguide formed on said substrate, said waveguide having a uniform height and a first width that varies;
   a second waveguide formed on said substrate, said second waveguide having said uniform height and a second width that varies;
   wherein said first and second waveguides are single mode;
   wherein said first and second waveguides are optically coupled in a region of said substrate so as to form a coupler, said first and second widths are reduced in said region to substantially uniform widths so that the optical coupling is substantially insensitive to fabrication error in said first and second widths and said uniform height; and
   wherein an aspect ratio of height to width for each of said first and second waveguides in said region is greater than 1.2.

2. A planar optical waveguide device, comprising: a substrate;
   a lower cladding deposited on said substrate;
   a core having a uniform height (H) and a variable width (W), and formed on said lower cladding;
   an upper cladding deposited on said core and said lower cladding so as to encapsulate said core between said upper cladding and said lower cladding; and
   wherein at a single-mode region said waveguide device has an aspect ratio of H/W>1.2, at a bend region said waveguide device has an aspect ratio of 0.8<W/H<1.1, and at a waveguide-fiber coupling region said waveguide device has an aspect ratio of W/H>1.2.

3. The device of claim 2, wherein said height of said waveguide is greater than 6 μm.

4. A planar optical waveguide device, comprising:
   a substrate;
   a lower cladding deposited on said substrate;
   a core having a uniform height (H) and a variable width (W), and formed on said lower cladding;
   an upper cladding deposited on said core and said lower cladding so as to encapsulate said core between said upper cladding and said lower cladding;
   wherein at a single-mode region said waveguide device has an aspect ratio of H/W>1.2, at a bend region said waveguide device has an aspect ratio of 0.8<W/H<1.1, and at a waveguide-fiber coupling region said waveguide device has an aspect ratio of W/H>1.2; and
   a second waveguide comprising a second core encapsulated between said lower and upper cladding, said second waveguide being configured so as to optically interact with said waveguide, and said second core having a height substantially equal to said height of said core and a variable width.

5. The device of claim 4, wherein said waveguide and said second waveguide are optically coupled in a coupling region, said coupling region having a coupling length that is substantially independent of manufacturing variations in said widths of said core and second core.

6. A planar optical waveguide device, comprising:
   a substrate;
   a lower cladding deposited on said substrate;
   a core having a uniform height (H) and a variable width (W), and formed on said lower cladding;
   an upper cladding deposited on said core and said lower cladding so as to encapsulate said core between said upper Cladding and said lower cladding;
   wherein at a single-mode region said waveguide device has an aspect ratio of H/W>1.2, at a bend reaction said waveguide device has an aspect ratio of 0.8<W/H<1.1, and at a waveguide-fiber coupling region said waveguide device has an aspect ratio of W/H>1.2; and
   wherein said width of said waveguide in a bend region of said waveguide is increased to a predetermined uniform width throughout said bend section such that said waveguide guides multi-modes resulting in reduced bend loss.

7. A planar optical waveguide device comprising at least two waveguides on a substrate which are optically interactive at various regions, each said waveguide having a height and a width, said waveguide device comprising the following regions:
   a coupling region in which said waveguides are optically coupled and wherein said width of each said waveguide is reduced such that each said width is substantially equal in said coupling region and a ratio of said height to said width for each said waveguide in said coupling region is greater than 1.2 in order to minimize the effect of manufacturing variations in said width with regard to coupling efficiency; and an interface region in which said waveguides are interfaced with respective optical fibers and wherein said width of each said waveguide at said interface region is increased to greater than 120% of said height for each respective said waveguide in order to reduce modefield mismatch between said waveguides and the optical fibers.

8. The device of claim 7, further including a bend region in which each said waveguide bends and wherein said widths of each said waveguide is increased to a uniform width in said bend region in order to reduce bend loss.

9. A planar optical waveguide device, comprising:

a plurality of unequal length waveguides having respective first and second ends, each said unequal length waveguide having a ratio of core width to core height of greater than 1.15;

a single-mode region having an aspect ratio of H/W>1.2 at respective said first and said second ends of each said unequal length waveguide; and whereby the phase difference between said unequal length waveguides is stabilized against fabrication errors in core width.

10. The device of claim 1, wherein said first and second widths are equal in said region.

* * * * *